United States Patent
Denifl et al.

(10) Patent No.: US 10,870,718 B2
(45) Date of Patent: Dec. 22, 2020

(54) CATALYST COMPONENT

(71) Applicant: Borealis AG, Vienna (AT)

(72) Inventors: Peter Denifl, Linz (AT); Torvald Vestberg, Porvoo (FI); Hanna-Leena Rönkkö, Porvoo (FI); Timo Leinonen, Tolkkinen (FI)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 15/741,861

(22) PCT Filed: Jul. 14, 2016

(86) PCT No.: PCT/EP2016/066717
§ 371 (c)(1),
(2) Date: Jan. 4, 2018

(87) PCT Pub. No.: WO2017/009405
PCT Pub. Date: Jan. 19, 2017

(65) Prior Publication Data
US 2018/0194881 A1 Jul. 12, 2018

(30) Foreign Application Priority Data

Jul. 16, 2015 (EP) .................................... 15177135
Jul. 16, 2015 (EP) .................................... 15177143

(51) Int. Cl.
C08F 4/649 (2006.01)
C08F 4/654 (2006.01)
C08F 110/06 (2006.01)
C08F 4/02 (2006.01)

(52) U.S. Cl.
CPC .......... C08F 110/06 (2013.01); C08F 4/6494 (2013.01); C08F 4/654 (2013.01); C08F 2410/03 (2013.01)

(58) Field of Classification Search
CPC .......... C08F 4/646; C08F 4/649; C08F 4/654; C08F 110/06; C08F 4/6494
See application file for complete search history.

(56) References Cited

U.S. PATENT DOCUMENTS

| 2005/0176900 A1 | 8/2005 | Zhu et al. | |
| 2016/0145366 A1* | 5/2016 | Wang | C08L 23/142 |
| | | | 526/66 |

FOREIGN PATENT DOCUMENTS

| EP | 0 083 073 A1 | 7/1983 |
| EP | 0 083 074 A1 | 7/1983 |
| EP | 0 713 886 A2 | 5/1996 |
| EP | 0 887 379 A1 | 12/1998 |
| EP | 0 926 165 A1 | 6/1999 |
| EP | 0 856 013 B1 | 7/2000 |
| EP | 2 610 270 A1 | 7/2013 |
| EP | 2 610 271 A1 | 7/2013 |
| EP | 2 610 272 A1 | 7/2013 |
| EP | 2 610 274 A1 | 7/2013 |
| WO | WO 1992/012182 A1 | 7/1992 |
| WO | WO 1999/024478 A1 | 5/1999 |
| WO | WO 1999/024479 A1 | 5/1999 |
| WO | WO 1999/57160 A1 | 11/1999 |
| WO | WO 2000/08073 A1 | 2/2000 |
| WO | WO 2000/08074 A1 | 2/2000 |
| WO | WO 2000/068315 A1 | 11/2000 |
| WO | WO 2001/055230 A1 | 8/2001 |
| WO | WO 2003/000754 A1 | 1/2003 |
| WO | WO 2003/000757 A1 | 1/2003 |
| WO | WO 2004/000899 A1 | 12/2003 |
| WO | WO 2004/029112 A1 | 4/2004 |
| WO | WO 2004/111095 A1 | 12/2004 |
| WO | WO 2007/137853 A1 | 12/2007 |
| WO | WO 2012/007430 A1 | 1/2012 |
| WO | WO 2013/098138 A1 | 7/2013 |
| WO | WO 2013/098149 A1 | 7/2013 |
| WO | WO 2014/118164 A1 | 8/2014 |
| WO | WO 2014/139811 A2 | 9/2014 |
| WO | WO 2015/059117 A1 | 4/2015 |

OTHER PUBLICATIONS

Busico et al., "Alk-1-ene Polymerization in the Presence of a Monocyclopentadienyl Zirconium(IV) Acetamidinate Catalyst: Microstructural and Mechanistic Insights," *Macromol. Rapid Commun.* 28: 1128-1134 (2007).
Busico et al., "Full Assignment of the 13C NMR Spectra of Regioregular Polypropylenes: Methyl and Methylene Region," *Macromolecules* 30:6251-6263 (1997).
Busico et al., "Microstructure of polypropylene," *Prog. Polym. Sci.* 26:443-533 (2001).
Zhou et al., "A new decoupling method for accurate quantification of polyethylene copolymer composition and triad sequence distribution with 13C NMR," *J. Magnet. Reson.* 187: 225-233 (2007).
European Patent Office, International Search Report in International Application No. PCT/EP2016/066717 (dated Oct. 26, 2016).
European Patent Office, Written Opinion in International Application No. PCT/EP2016/066717 (dated Oct. 26, 2016).
International Bureau of WIPO, International Preliminary Report on Patentability in International Application No. PCT/EP2016/066717 (dated Jan. 16, 2018).

(Continued)

*Primary Examiner* — Caixia Lu
(74) *Attorney, Agent, or Firm* — Leydig, Voit & Mayer, Ltd.

(57) ABSTRACT

The present invention relates to a solid, particulate catalyst component having an mean particle size range of 5 to 200 μm and comprising a compound of a Group 2 metal, a compound of a transition metal of Group 4 to 6, and at least two internal electron donors being different to each other and being non-phthalic organic compounds selected from (di) esters of non-phthalic carboxylic (di)acids, 1,3-diethers and di-esters of 1,3-diol compounds and derivatives thereof, and wherein the solid particulate catalyst component is free of any external support material. The invention relates also to the preparation of the catalyst component and a polymerization process for producing propylene polymers.

8 Claims, 1 Drawing Sheet

(56) References Cited

OTHER PUBLICATIONS

Figure 1:
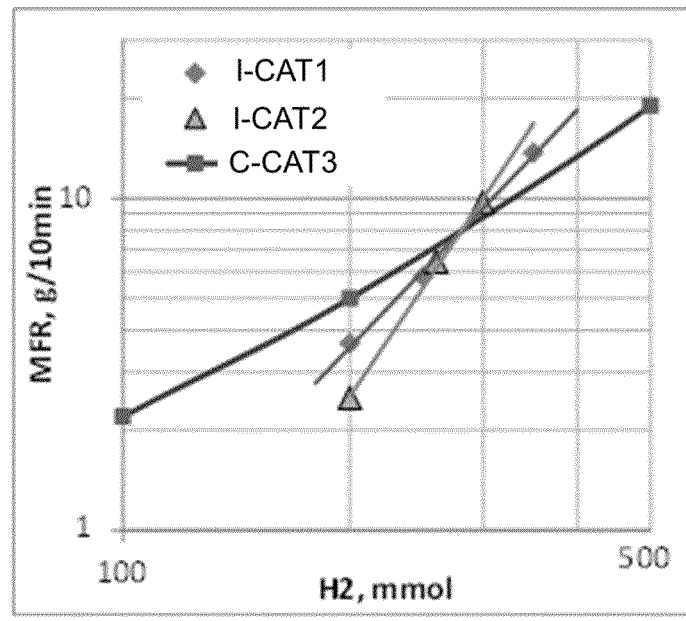

European Patent Office, Communication pursuant to Article 94(3) EPC in European Patent Application No. 16 739 107.7 (dated Jul. 22, 2019).
U.S. Appl. No. 14/911,295, filed Feb. 10, 2016.
U.S. Appl. No. 14/911,299, filed Feb. 10, 2016.
U.S. Appl. No. 14/911,300, filed Feb. 10, 2016.
U.S. Appl. No. 14/914,501, filed Feb. 25, 2016.
U.S. Appl. No. 15/022,664, filed Mar. 17, 2016.
U.S. Appl. No. 15/022,671, filed Mar. 17, 2016.
U.S. Appl. No. 15/027,129, filed Apr. 4, 2016.
U.S. Appl. No. 15/029,493, filed Apr. 14, 2016.
U.S. Appl. No. 15/030,556, filed Apr. 19, 2016.
U.S. Appl. No. 15/039,107, filed May 25, 2016.
U.S. Appl. No. 15/101,837, filed Jun. 3, 2016.
U.S. Appl. No. 15/102,628, filed Jun. 8, 2016.
U.S. Appl. No. 15/103,744, filed Jun. 10, 2016.
U.S. Appl. No. 15/103,783, filed Jun. 10, 2016.
U.S. Appl. No. 15/106,101, filed Jun. 17, 2016.
U.S. Appl. No. 15/113,517, filed Jul. 22, 2016.
U.S. Appl. No. 15/113,907, filed Jul. 25, 2016.
U.S. Appl. No. 15/113,922, filed Jul. 25, 2016.
U.S. Appl. No. 15/115,929, filed Aug. 2, 2016.
U.S. Appl. No. 15/310,283, filed Nov. 10, 2016.
U.S. Appl. No. 15/514,641, filed Mar. 27, 2017.
U.S. Appl. No. 15/531,974, filed May 31, 2017.
U.S. Appl. No. 15/526,957, filed May 15, 2017.
U.S. Appl. No. 15/566,588, filed Oct. 13, 2017.

* cited by examiner

CATALYST COMPONENT

CROSS-REFERENCE TO RELATED APPLICATIONS

This patent application is the U.S. national phase of International Application No. PCT/EP2016/066717, filed on Jul. 14, 2016, which claims the benefit of European Patent Application No. 15177135.9, filed Jul. 16, 2015, and European Patent Application No. 15177143.3, filed Jul. 16, 2015, the disclosures of which are incorporated herein by reference in their entireties for all purposes.

The present invention relates to a new catalyst component and preparation thereof. Especially the present invention relates to a new Ziegler-Natta particulate olefin polymerization catalyst component being free of any phthalic compounds, a catalyst comprising said component, process for producing a-olefin polymers in the presence of said catalyst component and to the use of said catalyst component in a-olefin polymerization processes.

BACKGROUND OF THE INVENTION

Propylene polymers are commonly produced in a process using Ziegler-Natta type catalysts. Propylene polymers are used in a wide variety of end applications.

Ziegler-Natta (ZN) type polyolefin catalysts are well known in the field of polymers. Generally they comprise (a) at least a catalyst component formed from a transition metal compound of Group 4 to 6 of the Periodic Table (IUPAC, Nomenclature of Inorganic Chemistry, 1989), a metal compound of Group 1 to 3 of the Periodic Table (IUPAC), and, optionally, a compound of group 13 of the Periodic Table (IUPAC) and/or at least one internal electron donor compound. ZN catalyst may also comprise (b) further catalyst component(s), such as a cocatalyst and/or an external donor.

Various methods for preparing ZN catalysts are known in the state of art. In one known method, a supported ZN catalyst system is prepared by impregnating the catalyst components on a particulate support material. Typical support materials in catalyst preparation are inorganic or organic particulate carrier material, such as silica, $MgCl_2$, or polymeric materials.

In WO 2001/55230, the catalyst component(s) are supported on a porous, inorganic or organic particulate carrier material, such as silica. EP 713886 of Japan Olefins describes the formation of MgCl2 adduct with an alcohol which is then emulsified and finally the resultant mixture is quenched to cause the solidification of the droplets. EP 856013 of BP discloses the formation of a solid Mg-based carrier, wherein the Mg-component containing phase is dispersed to a continuous phase and the dispersed Mg-phase is solidified by adding the two-phase mixture to a liquid hydrocarbon.

The formed solid carrier particles are normally treated with a transition metal compound and optionally with other compounds for forming the active catalyst. Accordingly, in case of external carriers, some examples of which are disclosed above, the morphology of the carrier is one of the defining factors for the morphology of the final catalyst.

One disadvantage encountered with the supported catalyst systems is that distribution of the catalytically active compounds on the support material is highly dependent on the support particle structure, like compactness of the support particles, porosity and pore size distribution. As a result this may often lead to non-uniform distribution of the active component(s) within the catalyst particle. As a consequence of the uneven distribution of the active sites in catalyst particles catalysts with intra-particle and inter-particle in-homogeneities are obtained, which leads finally to inhomogeneous polymer particles. Further, support material will remain in the final polymer as a residue, which might be harmful in some polymer applications. From polymerization process point of view such in-homogeneities tend to cause problems, like stickiness and agglomeration formation.

WO 2000/08073 and WO 2000/08074 describe further methods for producing a solid ZN catalyst, wherein a solution of a Mg-based compound and one or more further catalyst compounds are formed and the reaction product thereof is precipitated out of the solution by heating the system. Furthermore, EP 926165 discloses another precipitating method, wherein a mixture of MgCl2 and Mg-alkoxide is precipitated together with a Ti-compound to give a ZN catalyst.

EP 83074 and EP 83073 of Montedison disclose methods for producing a ZN catalyst or a precursor thereof, wherein an emulsion or dispersion of Mg and/or Ti compound is formed in an inert liquid medium and said system is reacted with an Al-alkyl compound to precipitate a solid catalyst. According to examples said emulsion is then added to a larger volume of Al-compound in hexane and prepolymerised to cause the precipitation.

According to US 2005/0176900 a magnesium compound, an alcohol, an ether, a surfactant and an alkyl silicate are reacted first to get a catalyst support, which is then further reacted with a titanium compound and consequently the solid titanium catalyst component is obtained via precipitation. The catalyst component further comprises an internal donor, which can be selected from a great variety of compounds.

WO 03/000757 as well WO 03/000754 describe a process for the preparation of an olefin polymerization catalyst component, enabling to prepare solid particles of a catalyst component comprising a Group 2 metal together with a transition metal, however without using any external carrier material or without using conventional precipitation methods, but using so called emulsion-solidification method for producing solid catalyst particles. In the process a phthalate type internal electron donor is prepared in situ during the catalyst preparation. Conditions during preparation and chemicals are selected so that an emulsion is formed. Droplets of the dispersed phase of the emulsion form the catalyst component, and solidifying the droplets results in solid particulate catalyst.

WO 2004/029112 and WO2007137853 disclose a further modification of the emulsion-solidification method as described in WO 03/000757 and WO 03/000754, and relate thus to a process for preparing an olefin polymerization catalyst component, wherein the process is further characterized in that a specific aluminum alkyl compound is brought into contact with the catalyst component, enabling a certain degree of activity increase at higher temperatures.

A further aspect in recent catalyst development work is to avoid as much as possible the use of substances which are considered as potential harmful compounds as regards to health and environmental aspects. One class of substances which has been considered as potential harmful compounds is phthalates, which have been commonly used as internal electron donors in Ziegler-Natta type catalysts. Although the amount of these phthalates as internal donors in the final polymer is very small, not even detectable, there has been a need to find out alternative compounds to replace phthalate compounds and still get catalysts having at least a satisfactory activity and excellent morphology resulting in desired polymer properties as well as in a fluent polymerization process.

Use of non-phthalate internal electron donors is as such not new in ZN catalysts. However, such donors are mainly used in catalysts, which are prepared by supporting the catalyst components on an external carrier. Drawbacks of such supported catalysts are described above.

Thus it has been highly appreciated to find out a way for preparing solid olefin polymerization catalyst components which allows the formation of said solid catalyst components without using traditional phthalate type donors and without using any external support material.

Lot of work has been done in order to replace phthalate donors, or phthalic donor precursors with non-phthalate donors or non-phthalic donor precursors in catalyst preparation process, where no external support material is used. Examples of such non-phthalic catalysts and catalyst preparation methods via emulsion-solidification or precipitation method are disclosed e.g. in patent publications WO 2012/007430, WO 2013/098149 and WO 2013/098138.

However, even though the solid catalyst prepared without using any external support material and without any phthalic compounds as described e.g. in WO 2012/007430, WO 2013/098149 and WO 2013/098138 has shown to have many beneficial properties, there is still room to improve and fine-tune the properties of the catalyst.

Especially some of the properties of the propylene polymers produced with this type of catalysts do not fulfill all the desired requirements. Especially there has been a need to provide catalyst being able to produce polypropylene having a higher isotacticity than with the present similar type of catalyst. High isotacticity is a desired feature in many polymer applications.

A typically disadvantage of the catalysts with a satisfactory activity is that they are suitable for producing polymers with a restricted range of MFR, meaning that different catalysts are needed for producing polymers with high and low MFR, if the activity is desired to be kept on a good level. MFR of the targeted polymer is typically controlled by the amount hydrogen feed, which in turn effects on the activity. However, in commercial scale production, activity is desired to be kept on constant level.

Activity and hydrogen response are essential features of the catalyst. In producing propylene polymers having low MFR (i.e. high molecular weight, Mw) a low amount of hydrogen is needed. However, such a low amount of hydrogen results easily in a drastic drop in activity of the catalyst, if the catalyst is not designed for having low MFR capability. If the catalyst has too high hydrogen response at low MFR, it is not suitable for producing low MFR polymer. On the other hand, if polymer with high MFR (low Mw) is produced, higher amount of hydrogen is needed. If the catalyst is not hydrogen sensitive enough, the amount of hydrogen needed for producing high MFR polymer might be easily to be increased to a level, which is not possible to use in a polymerization process, i.e. it is not possible to make very high MFR, even with a maximum hydrogen concentration in the reactor. If the catalyst has good hydrogen response at high MFR range, the amount of hydrogen can be reduced to a moderate amount of hydrogen. Further, a good hydrogen response of the catalyst makes it possible to produce polymers with very high MFR.

The problem of prior art catalysts is that these two features (low hydrogen response at low MFR and high hydrogen response at high MFR) and further combined with good activity over the whole MFR range are not typically included in the performance of the same catalyst.

Accordingly, although much development work has been done in the field of Ziegler-Natta catalysts using non-phthalic donors or donor precursors, there remains a need for improving catalyst properties and performance. Thus, there has been a clear need to find a solution to solve the problem relating to the ability of the non-phthalate, solid catalyst, but being free of external carrier, to produce polypropylene with high isotacticity.

Further, there has been a need to provide a similar type of catalyst component being able to produce with a satisfactory activity propylene polymers within a wide range of MFR (with different amounts of hydrogen).

Object of the Invention

Accordingly, it is one object of the present invention to provide a solid particulate olefin polymerization catalyst component being free of any phthalic compounds and external support material and which catalyst has improved properties and performance. Especially the object is to provide a catalyst component having improved capability to produce propylene polymers with high isotacticity and/or to produce propylene polymers within wide range of MFR without essential effect on the activity. Further, the object of the invention is to provide a method for producing said solid particulate catalyst component having properties and performance as described above.

A further object of the present invention is to provide a catalyst comprising the particulate polymerization catalyst component of the present invention and a cocatalyst and optionally an external donor.

Still a further object of the invention is to use the solid catalyst particulate component in polymerization processes, especially for producing propylene polymers.

It has now been surprisingly found that problems as indicated above can be solved and catalyst performance improved by providing a new catalyst component, which is a modified version the prior art catalyst component being free of external carrier material and prepared without any phthalic compounds. Thus, the preparation method of such prior art catalyst components is modified as well.

Description of the Invention

Accordingly the present invention provides a particulate olefin polymerization catalyst component as defined herein.

Thus, the present invention provides a solid, particulate catalyst component having a mean particle size range of 5 to 200 µm and comprising
  i) a compound of Group 2 metal, IUPAC, Nomenclature of Inorganic Chemistry, 1989
  ii) a compound of a transition metal of Group 4 to 6, IUPAC, Nomenclature of Inorganic Chemistry, 1989 and
  iii) at least two internal electron donors (ID-1) and (ID-2) being different to each other,
  wherein the at least two internal electron donors are non-phthalic organic compounds being different to each other and selected from (di)esters of non-phthalic carboxylic (di)acids, 1,3-diethers and di-esters of 1,3-diol compounds and derivatives thereof, and wherein the solid particulate catalyst component is free of any phthalic compound and external support material.

The solid, particulate catalyst component of the invention solid, particulate catalyst component may contain a further internal electron donor (ID-3) being different to internal electron donors (ID-1) and (ID-2) and is selected from (di)esters of non-phthalic carboxylic (di)acids, 1,3-diethers and di-esters of 1,3-diol compounds and derivatives thereof.

Further, the present invention provides a method for producing a solid, particulate catalyst component being free of any phthalic compound and of any external carrier material as described herein.

In the present application expressions "carrier" and "support" have the same meaning and are interchangeable.

Thus, the catalyst component is obtainable, preferably obtained, by the method comprising
 a) providing a solution of
  $a_1$) at least a Group 2 metal alkoxy compound (Ax) being the reaction product of a Group 2 metal compound and an alcohol (A) comprising in addition to the hydroxyl moiety at least one ether moiety optionally in an organic liquid reaction medium; or
  $a_2$) at least a Group 2 metal alkoxy compound (Ax') being the reaction product of a Group 2 metal compound and an alcohol mixture of the alcohol (A) and a monohydric alcohol (B) of formula ROH, optionally in an organic liquid reaction medium; or
  $a_3$) a mixture of the Group 2 metal alkoxy compound (Ax) and a Group 2 metal alkoxy compound (Bx) being the reaction product of a Group 2 metal compound and the monohydric alcohol (B), optionally in an organic liquid reaction medium; or
  $a_4$) Group 2 metal alkoxy compound of formula M$(OR_1)_n(OR_2)_m X_{2-n-m}$ or mixture of Group 2 alkoxides M$(OR_1)_n X_{2-n'}$ and M$(OR_2)_m X_{2-m'}$, where M is Group 2 metal, X is halogen, $R_1$ and $R_2$ are different alkyl groups of $C_2$ to $C_{16}$ carbon atoms, and $0 \leq n < 2$, $0 \leq m < 2$ and $n+m \leq 2$, provided that both n and m are not simultaneously zero, $0 \leq n' \leq 2$ and $0 < m' \leq 2$; and
 b) adding said solution from step a) to at least one compound of a transition metal of Group 4 to 6,
 c) obtaining the solid catalyst component particles,
 d) washing the catalyst component particles and
 e) recovering the solid particles of the catalyst component, and
wherein
a first internal electron donor (ID-1), or a precursor thereof, is added at least at any step prior to step c), a second internal electron donor (ID-2) and an optional additional internal donor (ID-3), or precursors thereof, are added at any step before step e), and wherein the internal donors (ID-1), (ID-2) and the optional additional internal donor (ID-3), or precursors thereof, are non-phthalic organic compounds being different from each other and are selected from (di)esters of non-phthalic carboxylic (di)acids, 1,3-diethers and di-esters of 1,3-diol compounds and derivatives thereof.

No external carrier material is used in the preparation of the catalyst component of the present invention.

Further, the present invention provides the solid particulate catalyst component obtainable in accordance with the process of the present invention.

Furthermore the present invention provides a process for producing olefin polymers, especially propylene polymers in the presence of the catalyst component as defined herein or produced by the method as described herein.

Furthermore, the present invention relates to the use of the catalyst component as defined herein for producing propylene polymers.

The invention will be described in the following in greater detail, referring to the particular preferred embodiments. Essential in the present invention is that a solid catalyst component is prepared by using at least two internal non-phthalic electron donors as defined above, but without using any external support material, and that said solid catalyst component is used in the polymerization process for producing propylene polymers.

The catalyst component of the present invention in the form of solid particles and having desired chemical composition, morphology and/or particle size and/or particle size distribution is suitable for use in olefin polymerization, in particular for propylene polymerization. Thus polymers produced using the inventive catalyst component, comprise no phthalic compounds, like phthalates, originating from catalysts.

According to the procedure above the solid catalyst can be obtained via precipitation method or via emulsion—solidification method depending on the physical conditions, especially temperature, used in steps b) and c). Emulsion is also called liquid/liquid two-phase system.

In both methods (precipitation or emulsion-solidification) the catalyst chemistry is the same.

In precipitation method combination of the solution of step a) with at least one transition metal compound in step b) is carried out and the whole reaction mixture is kept at least at 50° C., more preferably in the temperature range of 55 to 110° C., more preferably in the range of 70 to 100° C., to secure full precipitation of the catalyst component in form of a solid particles (step c).

In emulsion—solidification method in step b) the solution of step a) is typically added to the at least one transition metal compound at a lower temperature, such as from −10 to below 50° C., preferably from −5 to 30° C. whereby an emulsion is formed. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C.

In emulsion method, the two phase liquid-liquid system may be formed by simple stirring the reaction mixture of the solution of step a) as defined above with the compound of a transition metal of Group 4 to 6 and optionally adding further solvent(s) and additives, such as the turbulence minimizing agent (TMA) and/or the emulsifying agents and/or emulsion stabilizers, which are used in a manner known in the art for facilitating the formation of and/or stabilize the emulsion. Preferably, the emulsion stabilizers are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene.

The optional organic liquid reaction medium and the optional further solvents are organic solvents selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Heptane and pentane are particular preferred are the optional further solvents.

According to the replica effect, the polymer particles produced by using the inventive catalyst have desired morphological properties, too.

The preferred inventive method for preparing the solid catalyst component of the present invention is based on emulsion-solidification method in which method no separate external carrier materials such as silica or $MgCl_2$ are needed in order to get solid catalyst particles. In the present application expressions emulsion and liquid/liquid two-phase system mean the same and are interchangeable with each other.

A catalyst component prepared by emulsion—solidification method is a preferred catalyst of the present invention. Further, said preferred catalyst is preferably used in the propylene polymerization process.

In the present application the expressions "internal electron donor", "internal donor" and "donor" have the same meaning and can be used interchangeable. In case an external donor is discussed in the present application, it is always disclosed as "external electron donor" or "external donor".

As indicated above the solid catalyst component of the present invention comprises
    i) a compound of Group 2 metal, IUPAC, Nomenclature of Inorganic Chemistry, 1989

The compound of Group 2 metal comprises Group 2 metal alkoxide, which is provided as described in step a) for preparing the solid catalyst component.

The Group 2 metal is preferably magnesium.

In step a) a solution of a Group 2 metal alkoxy compound is provided. This can be provided in the following ways:

$a_1$) providing a solution of at least a Group 2 metal alkoxy compound (Ax) being the reaction product of a Group 2 metal compound (MC) and a monohydric alcohol (A) comprising in addition to the hydroxyl moiety at least one ether moiety optionally in an organic liquid reaction medium; or $a_2$) providing a solution of at least a Group 2 metal alkoxy compound (Ax') being the reaction product of a Group 2 metal compound (MC) and an alcohol mixture of the monohydric alcohol (A) and a monohydric alcohol (B) of formula ROH, optionally in an organic liquid reaction medium; or $a_3$) providing a solution of a mixture of the Group 2 metal alkoxy compound (Ax) and a Group 2 metal alkoxy compound (Bx) being the reaction product of a Group 2 metal compound (MC) and the monohydric alcohol (B), optionally in an organic liquid reaction medium; or $a_4$) providing a solution of Group 2 metal alkoxy compound of formula $M(OR_1)_n(OR_2)_mX_{2-n-m}$ or mixture of Group 2 alkoxides $M(OR_1)_nX_{2-n'}$ and $M(OR_2)_mX_{2-m'}$, where M is Group 2 metal, X is halogen, $R_1$ and $R_2$ are different alkyl groups of $C_2$ to $C_{16}$ carbon atoms, and $0 \le n < 2$, $0 < m < 2$ and $n+m \le 2$, provided that both n and m≠0, $0 < n' \le 2$ and $0 < m' \le 2$;

In a preferred embodiment in step a) the solution of $a_2$) or $a_3$) are used, i.e. a solution of (Ax') or a solution of a mixture of (Ax) and (Bx), especially the solution of $a_2$).

The Group 2 metal, preferably magnesium alkoxy compounds (Ax), (Ax') and (Bx) can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds ($a_4$) and used as such in the catalyst preparation process of the invention.

In a preferred embodiment in step a) the solution of $a_2$) or $a_3$) are used, i.e. a solution of (Ax') or a solution of a mixture of (Ax) and (Bx).

Illustrative examples of alcohols (A) are glycol monoethers. Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol, 1,3-propylene-glycol-monobutyl ether and 3-butoxy-2-propanol, more preferred alcohols (A) being 2-(2-ethylhexyloxy)ethanol, 1,3-propylene-glycol-monobutyl ether and 3-butoxy-2-propanol. A particularly preferred alcohol (A) is 3-butoxy-2-propanol.

Illustrative monohydric alcohols (B) are of formula ROH, with R being straight-chain or branched $C_2$-$C_{16}$ alkyl residue, preferably $C_4$ to $C_{10}$, more preferably $C_6$ to $C_8$ alkyl residue The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 10:1 to 1:10, more preferably 6:1 to 1:6, still more preferably 5:1 to 1: 3, most preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Further, magnesium dialkoxides, magnesium diaryloxides, magnesium aryloxyhalides, magnesium aryloxides and magnesium alkyl aryloxides can be used. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula R" $(OH)_m$ to obtain said magnesium alkoxide compounds. Preferred polyhydric alcohols, if used, are alcohols, wherein R" is a straight-chain, cyclic or branched $C_2$ to $C_{10}$ hydrocarbon residue, and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Heptane and pentane are particular preferred.

The reaction for the preparation of the magnesium alkoxy compound may be carried out at a temperature from 0° to 80° C., preferably from 20 to 70° C. Most suitable temperature is selected depending on the Mg compound and alcohol(s) used.

The solid catalyst of the present invention further comprises
    ii) a compound of a transition metal of Group 4 to 6, IUPAC, Nomenclature of Inorganic Chemistry, 1989

The compound of a Group 4 to Group 6 metal is preferably a Group 4 metal compound and is most preferably a titanium compound.

The compound of a Group 4 to 6 metal to be reacted with the Group 2 metal alkoxy compound is preferably a halide, preferably Group 4 halide, more preferably titanium tetrahalide. Equivalent to titanium tetrahalide is the combination of an alkoxy titanium halide and a halogenation agent therefore, which are able to form a titanium tetrahalide in situ. The most preferred halide is the chloride. Thus, the most preferred transition metal compound is $TiCl_4$.

It is possible to provide the transition metal compound in step (b) as a solution in an organic liquid reaction medium. The organic liquid reaction medium, where said transition metal compound, especially $TiCl_4$, can be solved, can be the same as the organic liquid reaction medium used in step a) or can be different thereto, the latter being preferred. Preferably the organic liquid reaction medium for transition metal compound is $C_5$ to $C_{10}$ hydrocarbon, more preferably of a $C_6$ to $C_{10}$ alkane, like heptane, octane or nonane, or any mixtures thereof.

Group 2 metal compound as defined above is added to a compound of a transition metal of Group 4 to 6, or to a solution thereof, in step b) of the preparation of the solid catalyst component.

The solid catalyst of the present invention further comprises
iii) at least two different internal electron donors, which are selected from (di)esters of non-phthalic carboxylic (di)acids, 1,3-diethers and di-esters of 1,3-diol compounds and derivatives thereof.

Using at least two different internal donors as defined above is a key finding of the present invention and makes the catalyst component different to prior art catalysts of the same type.

In another embodiment of the present invention the solid catalyst component contains at least one, preferably one, additional internal electron donor (ID-3) being different to the internal electron donors (ID-1) and (ID-2) and is selected from (di)esters of non-phthalic carboxylic (di)acids, 1,3-diethers and di-esters of 1,3-diol compounds and derivatives thereof. According to this embodiment in the preparation of the solid catalyst component at least three, preferably three, different internal electron donors or donor precursors selected form (di)esters of non-phthalic carboxylic (di)acids, 1,3-diethers and di-esters of 1,3-diol compounds and derivatives thereof are used.

The first internal donor (ID-1) or precursor thereof used in the preparation of the catalyst component of the present invention is a non-phthalic organic compound selected from (di)esters of non-phthalic carboxylic (di)acids, 1,3-diethers and derivatives thereof. Preferably the first internal donor (ID-1) is a (di)ester of a (di)carboxylic acid, in particular selected from (di)esters belonging to a group comprising substituted or non-substituted malonates, maleates, substituted maleates, succinates, glutarates, cyclohexene-1,2-dicarboxylates and benzoates, and any derivatives thereof. More preferably the first internal donor is selected from substituted maleates, preferably 2-methyl maleates, which are also called citraconates. Most preferably the first internal donor is di-2-ethylhexyl citraconate.

The second internal donor (ID-2) and the optional additional internal donor(s) (ID-3), being all different from the first internal donor (ID-1) and different from each other, used in the preparation of the catalyst component of the present invention, is a non-phthalic organic compound selected from (di)esters of non-phthalic carboxylic (di)acids, 1,3-diethers, diesters of 1,3-diol compounds and derivatives thereof. I.e. all internal donors are different from each other.

More preferably the second and the additional internal donors are selected from diesters of 1,3-diol compounds. Most preferably the second (ID-2) and the additional internal electron donor (ID-3) are selected from diester of 1,3-diol compounds of formula (I)

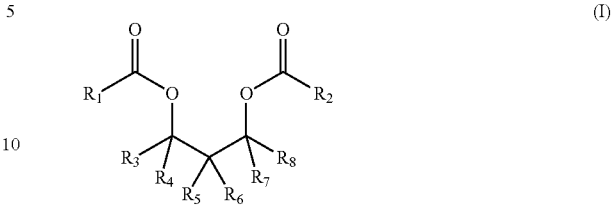

wherein
$R_1$ and $R_2$ are independently selected from linear or branched hydrocarbyl residues of 1 to 12 C-atoms, substituted or non-substituted cyclic aliphatic hydrocarbyl residues and aromatic hydrocarbyl residues of 3 to 18 C atoms,
$R_3$, $R_4$, $R_5$, $R_6$, $R_7$ and $R_8$ are independently selected from hydrogen, linear, branched hydrocarbyl residues of 1 to 12 C-atoms, substituted or non-substituted cyclic aliphatic hydricarbyl residues and aromatic hydrocarbyl residues of 3 to 12 C atoms, or two R's attached to adjacent C-atoms can form a double bond between said C-atoms they are attached to, or they can form a single substituted or non-substituted aliphatic or aromatic ring with 3 to 8 ring atoms, or a substituted or non-substituted fused aliphatic or aromatic ring system with the carbon atoms they are attached to, where the optional substituents can be hydrocarbyl residues of 1 to 6 C-atoms or with heteroatom containing residues.

In one preferred embodiment (ID-2) is an ester of formula I, where groups $R_1$ and $R_2$ are independently substituted or non-substituted benzyl residues and $R_3$, $R_4$, $R_5$, $R_6$, $R_7$ and $R_8$ form a fused aromatic 2-ring system optionally substituted with hydrocarbyl residues of 1 to 6 C-atoms.

Preferably the additional internal donor (ID-3) is selected from diester of 1,3-diol compounds of formula I, where $R_1$ and $R_2$ are as defined above, more preferably $R_1$ and $R_2$ are independently linear or branched hydrocarbyl residues of 1 to 6 C-atoms; still more preferably alkyl groups of 1 to 3 C-atoms;
$R_3$, $R_4$, $R_5$, $R_6$, $R_7$ and $R_8$ are preferably hydrogen or linear, branched or cyclic aliphatic hydrocarbyl residues of 1 to 6 C-atoms, and are more preferably hydrogen or linear or branched hydrocarbyl residues of 1 to 6 C-atoms, still more preferably hydrogen of alkyl groups of 1 to 3 C-atoms.

The first internal donor (ID-1) or precursor thereof is to be added before step c) of the catalyst preparation. It can thus be added to the solution of step a) or to the transition metal, i.e. Group 4 to 6 metal compound or to a solution thereof before adding the solution of step a) into said transition metal compound or solution thereof in step b), or after adding the solution of step a) into said transition metal, i.e. Group 4 to 6 metal compound or a solution thereof.

A same first internal donor (ID-1) can further be added at any step before the final recovery step e), preferably during the washing step d), if desired.

The second internal donor (ID-2) is added before the final recovery step e). Thus, the second internal donor (ID-2) can be added
to the solution of step a) or
to the transition metal, i.e. Group 4 to 6 metal compound or to a solution thereof before adding the solution of step a) into said transition metal compound in step b) or after adding the solution of step a) into said transition metal, i.e. Group 4 to 6 metal compound or a solution thereof, and/or during the washing step d).

The optional additional internal donor, like (ID-3), can be added at any step before the final recovery step e). It can be added at the same or different step as (ID-2). Thus, it can be added as a mixture with internal donors (ID-1) and (ID-2) or with (ID-2), or can be fed separately at the same or different step as (ID-2) during the catalyst preparation.

During the washing step the solid catalyst in the form of particles is washed at least once, typically at least three times. As washing liquids are used aromatic and/or aliphatic hydrocarbon solvents optionally containing $TiCl_4$ in one or more washing steps and/or internal electron donor(s). In some embodiment at least one washing can be done with pure $TiCl_4$.

According to the preferred embodiment of the present invention the second internal donor (ID-2) is added during the washing steps, more preferably only during the washing steps. Thus, (ID-2) is preferably added to the washing solvent, which optionally contains $TiCl_4$, and/or to the $TiCl_4$ used as a washing liquid.

If an additional internal electron donor (ID-3) is used, said internal donor is preferably added during the washing steps, more preferably only during the washing steps. Thus, the optional additional donor is added to the washing solvent, which optionally contains $TiCl_4$, and/or to the $TiCl_4$ used as a washing liquid.

(ID-2) and the optional additional electron donor (ID-3) can be added at the same or different washing step.

The aromatic hydrocarbon is most suitable toluene and the aliphatic hydrocarbon is most suitable selected from pentane and heptane.

The amount of internal donors (ID-1), (ID-2) and the optional additional internal donor (ID-3), added to the catalyst synthesis depend on the desired properties as well on the donor type.

Typically the molar ratio of the first internal donor (ID-1) to Mg (ID-1)/Mg added before step c) is in the range of 0.01-1.0, preferably in the range of 0.05-0.8, and more preferably in the range of 0.1-0.6, especially in the range of 0.2-0.6. The first internal donor can further be added to the washing steps in a molar ratio (ID-1/Mg) of 0 to 0.6.

The second (ID-2) and further internal donors (ID-3), can be added before step c) independently in a molar ratio (Internal donor/Mg) of 0-0.8, preferably 0-0.5. During the washing steps they are added independently in a molar ratios ratio (Internal donor/Mg) in the range of 0.01-1.0, preferably in the range of 0.02-0.6.

When the second and the optional third internal electron donors (ID-2) and (ID-3) are used in the preparation of the catalyst component of the present invention, it results in partial replacement of the first internal donor with the second and the optional additional donors. Thus, the amount of first internal donor in the final catalyst component of the invention is typically smaller than in comparative catalysts, where only one donor (the first donor) is used in catalyst preparation.

Suitable procedures for steps a) to d) are in principle known from the state of the art and are described for example in WO 2012/007430, WO 2013/098149 and WO 2013/098138, EP2610274, EP 2610270 and EP2610272.

Finally, the washed catalyst component is recovered. For isolating the solidified particles the reaction mixture is allowed to settle and the solid particles are recovered from this reaction mixture for example by syphoning or by an in-stream filtering unit. The recovered catalyst can further be dried, as by evaporation or flushing with nitrogen or it can be slurried to an oily liquid without any drying step.

The finally obtained Ziegler-Natta catalyst component is desirably in the form of solid particles having generally an mean particle size range of 5 to 200 μm, preferably 10 to 100. When the preferred emulsion-solidification method is used in catalyst preparation, particles are compact with low porosity and have surface area below 20 g/m$^2$, more preferably below 10 g/m$^2$. Typically the amount of Ti is 1 to 6 wt % and the amount of Mg is 8 to 20 wt % in the final catalyst component.

The amounts of internal donors in the final catalyst component can vary within a broad range. Thus, the amount of the first internal donor can be in the range of 0 to 30 wt-%, preferably in the range of 1 to 25 wt-%. The sum of amounts of the second and optional additional internal donors is in the range of 1 to 50 wt-%, preferably in the range of 5 to 40 wt-%, especially 5 to 35 wt-%. The total amount of internal donors in the final catalyst component is in the range of 1 to 60 wt-%, preferably 5 to 50 wt-%, especially 5 to 45 wt-%.

The Ziegler-Natta catalyst component of the invention is used in a polymerisation process preferably in association with a compound of a metal of Group 13 as a cocatalyst and with an external electron donor(s).

Thus, as further component in a propylene polymerization process an external donor (ED) is present. Suitable external donors include certain silanes, ethers, esters, amines, ketones, heterocyclic compounds and blends of these. It is especially preferred to use a silane. It is most preferred to use silanes of the general formula

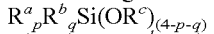

wherein R$^a$, R$^b$ and R$^c$ denote a hydrocarbon radical, in particular an alkyl or cycloalkyl group, and wherein p and q are numbers ranging from 0 to 3 with their sum p+q being equal to or less than 3. R$^a$, R$^b$ and R$^c$ can be chosen independently from one another and can be the same or different. Specific examples of such silanes are (cyclohexyl)(methyl)Si(OCH$_3$)$^2$, (phenyl)$_2$Si(OCH$_3$)$_2$ and (cyclopentyl)$_2$Si(OCH$_3$)$_2$, or external donors of general formula

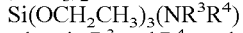

wherein R$^3$ and R$^4$ can be the same or different a represent a hydrocarbon group having 1 to 12 carbon atoms selected from branched aliphatic and cyclic aliphatic hydrocarbon groups.

More preferably both R$^3$ and R$^4$ are an ethyl group.

Especially preferred external donors (ED) are the dicyclopentyl dimethoxy silane donor (D-donor) or the cyclohexylmethyl dimethoxy silane donor (C-donor)

The co-catalyst is preferably a compound of a metal of Group 13 of the periodic table (IUPAC), e.g. organoaluminum, such as an aluminum compound, like aluminum alkyl, aluminum halide or aluminum alkyl halide compound. Accordingly, in one specific embodiment the co-catalyst (Co) is a trialkylaluminium, like triethylaluminium (TEAL), dialkyl aluminium chloride or alkyl aluminium dichloride or mixtures thereof. In one specific embodiment the co-catalyst (Co) is triethylaluminium (TEAL).

Preferably the ratio between the co-catalyst (Co) and the external donor (ED) [Co/ED] and/or the ratio between the co-catalyst (Co) and the transition metal (TM) [Co/TM] should be carefully chosen.

Accordingly, the mol-ratio of co-catalyst (Co) to external donor (ED) [Co/ED] must be in the range of 5 to 45, preferably is in the range of 5 to 35, more preferably is in the range of 5 to 25; and optionally the mol-ratio of co-catalyst (Co) to transition metal (like titanium) compound (TC)

[Co/TC] must be in the range of above 80 to 500, preferably is in the range of 100 to 350, still more preferably is in the range of 120 to 320.

Thus, it is a further object of the present invention to provide catalyst components in form of solid particles by a process as described above and to the use thereof for the preparation of a catalyst being suitable in olefin polymerization processes.

A further embodiment of the present invention is an olefin polymerization catalyst comprising particles of the catalyst component obtainable by the process as described above and a co-catalyst, preferably an alkyl aluminum co-catalyst and an external electron donor, and the use of said catalyst in a polymerization process.

The catalyst according to the invention is suitable for use in olefin polymerization, like ethylene or propylene, in particular for propylene polymerization, optionally with other co-monomers selected from $C_2$-$C_{12}$ monomers, preferably $C_2$-$C_6$ monomers.

It has been surprisingly found that a catalyst component of the present invention comprising at least two different non-phthalic internal electron donors allows optimising the properties and performance of the catalysts. By using the combination of at least two different donors, effecting in different ways on the catalyst properties results in optimised catalyst performance.

The first internal donor (ID-1) or precursor thereof has an essential role in the formation of the emulsion (liquid-liquid two phase system) and consequently in obtaining the desired morphology of the solid catalyst particles out of the emulsion, or in controlling the formation of the desired particle morphology during the catalyst preparation by the precipitation method.

The second internal donor (ID-2) and the optional third internal donor (ID-3) have an essential role in optimising the catalyst performance in polymerization processes leading to desired polymer properties. Especially, a surprising finding was that by using the catalyst component of the present invention the isotacticity of the propylene polymer can be increased compared to the catalyst component prepared in the same manner but using only one internal donor. Another surprising finding was that by using the catalyst of the present invention, preferably the embodiment where three different internal donors were used, it is possible to polymerise propylene optionally in the presence of comonomers with a high activity within a wide range of hydrogen resulting in a wide range of MFR's.

Polypropylenes with high isotacticity are as such known. However, they have been typically prepared by using traditional supported Ziegler-Natta catalysts. Further, such catalysts are typically prepared using phthalic compounds.

Polymerization processes, where the catalyst components of the invention are useful comprise at least one polymerization stage, where polymerization is typically carried out in solution, slurry, bulk or gas phase.

The polymerization process for the production of the polypropylene may be a continuous process or a batch process utilising known methods and operating in liquid phase, optionally in the presence of an inert diluent, or in gas phase or by mixed liquid-gas techniques.

The polypropylene may be produced by a single- or multistage polymerization process such as bulk polymerization, gas phase polymerization, slurry polymerization, solution polymerization or combinations thereof using the Ziegler-Natta catalyst as described above.

Accordingly, the at least one polymerization stage is preferably carried out in a slurry reactor which can be any continuous or simple stirred batch tank reactor or a loop reactor operating in bulk or slurry. Bulk means a polymerization in a reaction medium that comprises of at least 60% (w/w) monomer. According to the present invention the slurry reactor is preferably a (bulk) loop reactor.

If polymerization is performed in one or two loop reactors, the polymerization is preferably carried out in liquid propylene in the range from 60° C. to 80° C. The pressure is preferably between 5 and 60 bar. The molecular weight of the polymer chains and thereby the melt flow rate of the polypropylene, is regulated by adding hydrogen.

The process may further comprise pre- and post-reactors. Pre-reactors comprise typically pre-polymerization reactors. Hydrogen may be added into the prepolymerization stage to control the molecular weight of the prepolymer as is known in the art. Further, an antistatic additive may be used to prevent the particles from adhering to each other or to the walls of the reactor.

In one particular embodiment the process contains at least one bulk reactor zone and at least one gas phase reactor zone, each zone comprising at least one reactor and all reactors being arranged in cascade. In one particularly preferred embodiment the polymerization process for polymerising olefins, in particular propylene optionally with comonomers, like ethylene or other alpha-olefins, comprises at least one bulk reactor and at least one gas phase reactor arranged in that order.

A preferred multistage process is a "loop-gas phase"-process, such as developed by Borealis (known as BORSTAR® technology) described e.g. in patent literature, such as in EP 0 887 379, WO 92/12182 WO 2004/000899, WO 2004/111095, WO 99/24478, WO 99/24479 or in WO 00/68315. A further suitable slurry-gas phase process is the Spheripol® process of Basell.

Experimental Part
Measuring Methods
ICP Analysis (Al, Mg, Ti)

The elemental analysis of a catalyst was performed by taking a solid sample of mass, M, cooling over dry ice. Samples were diluted up to a known volume, V, by dissolving in nitric acid (HNO3, 65%, 5% of V) and freshly deionised (DI) water (5% of V). The solution was further diluted with DI water up to the final volume, V, and left to stabilize for two hours.

The analysis was run at room temperature using a Thermo Elemental iCAP 6300 Inductively Coupled Plasma—Optical Emmision Spectrometer (ICP-OES) which was calibrated using a blank (a solution of 5% HNO3), and standards of 0.5 ppm, 1 ppm, 10 ppm, 50 ppm, 100 ppm and 300 ppm of Al, Mg and Ti in solutions of 5% HNO3.

Immediately before analysis the calibration is 'resloped' using the blank and 100 ppm standard, a quality control sample (20 ppm Al, Mg and Ti in a solution of 5% HNO3 in DI water) is run to confirm the reslope. The QC sample is also run after every 5th sample and at
the end of a scheduled analysis set.

The content of Mg was monitored using the 285.213 nm line and the content for Ti using 336.121 nm line. The content of aluminium was monitored via the 167.079 nm line, when Al concentration in ICP sample was between 0-10 ppm (calibrated only to 100 ppm) and via the 396.152 nm line for Al concentrations above 10 ppm.

The reported values are an average of three successive aliquots taken from the same sample and are related back to the original catalyst by inputting the original mass of sample and the dilution volume into the software.

Donor Analysis via Gas Chromatography GC

The donor analysis of a catalyst was performed by taking a solid sample of mass, M, approximately 2 ml of solvent, dichloromethane, was added. Following this approximately 1 ml of deionised water was added to the vial. Finally, a known mass, N, of an internal standard, nonane, was added. The mixture was then sonicated for 15 min, to ensure full dissolution.

After sonication the sample is left to settle into two phases and an aliquot of the organic phase is removed, this is then filtered through a 0.45 µm nylon filter into a vial suitable for the gas chromatography instrument.

The analysis is performed on a Perkin Elmer Auto System XL Gas Chromatograph containing a split loop injector and flame ionization detector. The column is a DB-1, 30 m long with an inner diameter of 0.32 mm and a phase thickness of 0.25 µm. The system stays at 40° C. for 5 minutes before ramping at 10° C./min up to 250° C.; the system is kept at temperature for a further 4 minutes. If required the peak temperature could be raised to 300° C.

The results are calculated in the following manner.

$$\text{Component (wt \%)} = \frac{10 \; Ax * F * N}{Ay * Fistd * M} * 100$$

where:
Ax=component area
F=component factor
N=mass of internal standard (nonane), mg
Ay=area of internal standard (nonane)
Fistd=factor of internal standard (nonane)
M=mass of the sample, mg Surface area: BET with $N_2$ gas ASTM D 3663, apparatus Micromeritics Tristar 3000: sample preparation at a temperature of 50° C., 6 hours in vacuum.

Pore volume was measured according to ASTM 4641.

Mean particle size is given in pm and measured with Coulter Counter LS200 at room temperature with n-heptane as medium. The given mean particle size is arithmetic mean size and is based on volumetric amount.

Melt Flow Rate $MFR_2$: ISO 1133; 230° C./2.16 kg load

Xylene Cold Soluble (XCS)

Content of xylene cold soluble fraction was determined at 25° C. according to ISO 16152; first edition; 2005-07-01.

Isotacticity (FTIR)

70-80 mg of polypropylene sample was compression pressed with SPECAC hydraulic press to films having thickness of 90 µm. Films were scanned on a Nicolet magna-IR spectrometer 550. The absorption bands at 998 and 873 $cm^{-1}$ are related to the content of ⅓ helixes and originate from vibrations of at least 11-12 and 5 repeating units, respectively. A calibration curve was made to relate the ratio A(998)/A(973) to the triad tacticity values measured by $^{13}$NMR spectroscopy.

The peak heights at 998 and 973 $cm^{-1}$ were used in calculating the ratio ratio A(998)/A(973) . The FTIR isotacticity was given as an average of 3 measurements. The standard deviation was relatively small (<0,5%).

Isotacticity can also be measured by NMR spectroscopy as follows:

Isotacticity by NMR Spectroscopy

Quantitative nuclear-magnetic resonance (NMR) spectroscopy was used to quantify the isotacticity and content of regio-defects of the polypropylene homopolymers. Quantitative $^{13}C\{^{1}H\}$ NMR spectra recorded in the solution-state using a Bruker Advance III 400 NMR spectrometer operating at 400.15 and 100.62 MHz for $^{1}H$ and $^{13}C$ respectively. All spectra were recorded using a $^{13}C$ optimised 10 mm selective excitation probehead at 125° C. using nitrogen gas for all pneumatics. Approximately 200 mg of material was dissolved in 1,2-tetrachloroethane-$d_2$ (TCE-$d_2$). This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8k) transients were acquired per spectra. Quantitative $^{13}C\{^{1}H\}$ NMR spectra were processed, integrated and relevant quantitative properties determined from the integrals using proprietary computer programs. All chemical shifts are internally referenced to the methyl signal of the isotactic pentad mmmm at 21.85 ppm.

The tacticity distribution was quantified through integration of the methyl region between 23.6 and 19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromolecules 30 (1997) 6251). The pentad isotacticity was determined through direct integration of the methyl region and reported as either the mole fraction or percentage of isotactic pentad mmmm with respect to all steric pentads i.e. [mmmm]=mmmm/sum of all steric pentads. When appropriate integrals were corrected for the presence of sites not directly associated with steric pentads.

EXAMPLES

Used Chemicals:
2-ethyl-hexanol—CAS no 104-76-7
propylene glycol butyl mono ether—CAS no 5131-66-8, provided by Sigma-Aldrich
bis(2-ethylhexyl) citraconate—CAS no 1354569-12-2, provided by SymphaBase 2,2,4,-trimethyl-1,3-pentanediol dibenzoate—CAS no 68052-23-3, provided by Sigma-Aldrich
Necadd 447—provided by M-I SWACO
Viscoplex 1-254—provided by RohMax Additives GmbH
diethyl aluminum chloride—CAS no 96-10-6, provided by Witco
1,8-naphthalenediol bis(4-tert-butylbenzoate)—CAS no 331711-99-0
1,3-Propylene glycol diacetate—CAS no 628-66-0
di-octyl phthalate (DOP)—CAS no 117-81-7

FIG. 1: In FIG. 1 $MFR_2$ as a function of added hydrogen amount in the polymerization is disclosed for inventive catalyst components I-CAT1 and I-CAT2, and for comparative catalyst component C-CA3.

Figure 2:
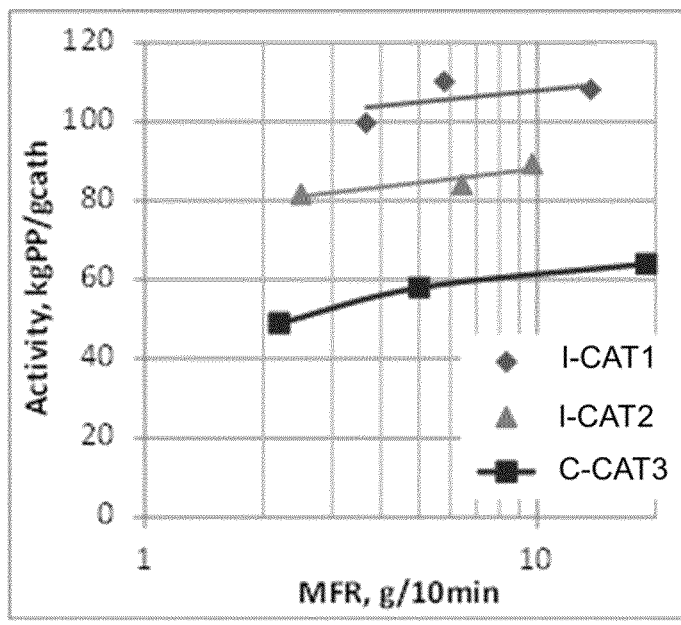

FIG. 2: In FIG. 2 activities of the catalyst components I-CAT1, I-CAT2, C-CA3 at different $MFR_2$-levels are disclosed.

Preparation of Solid Catalyst Components

Comparative Catalyst Component 1 (C-CAT1)

50 ml of 2-ethylhexanol and 11.8 ml of propylene glycol butyl monoether (in a molar ratio 4/1) were added to a 300 ml glass reactor. Then 171.4 ml of a 20% solution in toluene of BOMAG (butyl octyl magnesium) provided by Crompton GmbH were slowly added to the well stirred alcohol mixture. During the addition the temperature was kept below 30° C. ° C. After addition the temperature of the reaction mixture was raised to 60° C. and mixing was continued at this temperature for 60 minutes. Finally after cooling to room temperature the obtained Mg-alkoxide was transferred to bottles to be stored. 19.5 ml titanium tetrachloride was placed in a 300 ml reactor equipped with a mechanical stirrer at 25° C. and 4,0 ml of bis(2-ethylhexyl)citraconate (ID1) was added to $TiCl_4$. Mixing speed was adjusted to 170 rpm and the mixture was mixed 5 minutes. 26.5 g of Mg-complex prepared above were added within 17 minutes keeping the temperature at 25° C. 3.0 ml of Viscoplex 1-254 and 1.0 ml of a toluene solution with 2 mg Necadd 447 was added. Then 24.0 ml of heptane was added to form an emulsion. Mixing was continued for 30 minutes at 25° C. Then the reactor temperature was raised to 90° C. within 16.5 minutes. The reaction mixture was stirred for further 30 minutes at 90° C. Afterwards stirring was stopped and the reaction mixture was allowed to settle for 30 minutes at 80° C.

The solid material (catalyst slurry) was washed 5 times: Washings were made at 80° C. under stirring with 300 rpm.

Wash 1: Washing was made with 100 ml of toluene for 30 min

Wash 2: Washing was made with 30 ml $TiCl_4$ for 30 min

Wash 3: Washing was made with 100 ml of toluene for 30 min

Washes 4 and 5: Washings were made with 60 ml of heptane for 20 min and 10 min respectively Afterwards stirring was stopped and the reaction mixture was allowed to settle for 10 minutes decreasing the temperature to 70° C. with subsequent siphoning, and followed by $N_2$ sparging for 30 minutes to yield a catalyst powder.

Comparative Catalyst Component 2 (C-CAT2)

Catalyst component was prepared as C-CAT1, but $TiCl_4$ was placed in a 100 ml reactor and internal donor (ID-1) (bis(2-ethylhexyl) citraconate) was added also to the washing steps as follows:

Wash 1: Washing was made with a mixture of 65 ml of toluene and 0.67 ml of donor (molar ratio of (ID-1)/Mg was 0.1);

Wash 2: Washing was made with a mixture of 20 ml TiCl4 and 0.67 ml of donor (molar ratio of (ID-1)/Mg was 0.1);

Wash 3: Washing was made with a mixture of 65 ml of toluene and 0.67 ml (molar ratio of (ID-1)/Mg was 0.1);

Washes 4 and 5: Washings were made each with 40 ml of heptane;

afterwards, stirring was stopped and the reaction mixture was allowed to settle for 10 minutes decreasing the temperature to 70° C. with subsequent siphoning, and followed by $N_2$ sparging for 30 minutes to yield a catalyst powder.

Comparative Catalyst Component 3 (C-CAT3)

A catalyst component supported on magnesium dichloride based support was prepared as follows:

First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the catalyst was filtered and dried. Catalyst and its preparation concept is described in general e.g. in patent publications EP491566, EP591224 and EP586390. Ti content in the catalyst component was 1,9 wt-%.

Inventive Catalyst Component 1 (1-CAT1)

Catalyst component was prepared as C-CAT1, but was further modified by another set of washings, where the catalyst was treated by a second internal donor (ID-2), 1,8-naphthalenediol bis(4-tert-butylbenzoate), and a third internal donor (ID-3), 1,3-propylene glycol diacetate, during the additional washing steps as follows: All washings were made at 80° C. to 90° C., if not otherwise informed.

Wash 6: Washing was made with a mixture of 90 ml of toluene and 0.20 g donor (ID-2) (dissolved to toluene). Molar ratio of (ID-2)/Mg was 0,017.

Wash 7: Washing was made with a mixture of 30 ml $TiCl_4$ and 0.20 g of (ID-2) and 0.10 ml of (ID-3) (dissolved in 5 ml of toluene). Temperature was increased to 115° C. in this wash and molar ratio of (ID-2)/Mg was 0.017 and molar ratio of (ID-3)/Mg was 0.026. Wash 8: Washing was made with 100 ml of toluene.

Washes 9 and 10: Both washings were made with 60 ml of heptane. Afterwards stirring was stopped and the reaction mixture was allowed to settle for 10 minutes decreasing the temperature to 70° C. with subsequent siphoning, and followed by $N_2$ sparging for 20 minutes to yield an air sensitive powder.

Inventive Catalyst Component 2 (I-CAT2)

Catalyst component was prepared as C-CAT1, but washings of C-CAT1 were not done, but only the washing 7 to 10 of I-CAT1 above were done.

Table 1 shows the chemical composition of the catalyst components C-CAT1, C-CAT2, C-CAT3, I-CAT1 and I-CAT2.

TABLE 1

| | | | | Final catalyst component | | | | |
|---|---|---|---|---|---|---|---|---|
| Catalyst | ID-1 added to | ID-2 added to | ID-3 added to | Mg [wt %] | Ti [wt %] | ID-1 [wt %] | ID-2 [wt %] | ID-3 [wt %] |
| C-CAT1 | emulsion | — | — | 13.8 | 2.7 | 20.2 | — | — |
| C-CAT2 | emulsion + wash | — | — | 13.4 | 2.4 | 27.0 | — | — |
| C-CAT3 | Supported catalyst, DOP as donor | — | — | 20.0 | 1.9 | | — | — |
| I-CAT1 | emulsion | wash | wash | 15.0 | 2.2 | 3.8 | 26.5* | 2.3 |
| ICAT2 | emulsion | wash | wash | 15.2 | 2.2 | 5.1 | 24.5* | 2.2 |

*Calculated amounts. Calculations made according to the following formula: Amount of (ID-2)(wt-%) in the catalyst component = 100-[$MgCl_2$(wt-%) + $TiCl_4$(wt-%) + (ID-1)(wt-%)] + (ID-3)(wt-%)] = 100-[Mg(wt-%) × 3.91 + Ti(wt-%) × 3.96 + (ID-1)(wt-%) + (ID-3)(wt-%)] 3.91 = mol weight of $MgCl_2$/mol weight of Mg = 95.2 (g/mol)/24.3 (g/mol) 3.96 = mol weight of $TiCl_4$/mol weight of Ti = 189.7 (g/mol)/47.9 (g/mol)

The calculation is based on the assumption that all Mg is as $MgCl_2$, all Ti is as $TiCl_4$, and no other components are present except (ID-1) and (ID-3), the amount of which is analysed.

Polymerization

Polymerization were carried out with catalyst components C-CAT1, C-CAT2, C-CAT3 (Comparative polymerization examples CP1-CP5), and with I-CAT1 and I-CAT2 (Inventive polymerization examples IP1-1P6) as indicated in Table 2.

A 5 litre stainless steel reactor was used for propylene polymerisations.

About 0.9 ml triethyl aluminium (TEA) (from Witco, used as received) as a co-catalyst, ca 0.13 ml dicyclopentyl dimethoxy silane (DCDS), from Wacker, dried with molecular sieves, as an external donor and 30 ml n-pentane were mixed and allowed to react for 5 minutes. Half of the mixture was then added to the polymerization reactor and the other half was mixed with about 20 mg of a catalyst. After additional 5 minutes the catalyst/TEA/external donor/n-pentane mixture was added to the reactor. The Al/Ti ratio was 250 mol/mol and the Al/DCDS ratio was 10 mol/mol. Hydrogen (amount in Table 2) and 1400 g propylene were introduced into the reactor and the temperature was raised within ca 15 minutes to the polymerization temperature (80° C.). The polymerization time after reaching polymerization temperature was 60 minutes, after which the polymer formed was taken out from the reactor.

Polymerization results are disclosed in Table 2.

TABLE 2

| Polymerisation example | Catalyst component | H2/ mmol | Activity/ kgPP/gcat | MFR$_2$/ g/10 min |
|---|---|---|---|---|
| CP1 | C-CAT1 | 200 | 34 | 18.5 |
| CP2 | C-CAT2 | 200 | 42 | 9.9 |
| CP3 | C-CAT3 | 200 | 57 | 5.0 |
| CP4 | C-CAT3 | 100 | 47 | 2.2 |
| CP5 | C-CAT3 | 500 | 62 | 18 |
| IP1 | I-CAT1 | 200 | 100 | 3.7 |
| IP2 | I-CAT1 | 250 | 111 | 5.8 |
| IP3 | I-CAT1 | 350 | 109 | 13.7 |
| IP4 | I-CAT2 | 200 | 82 | 2.5 |
| IP5 | I-CAT2 | 260 | 84 | 6.4 |
| IP6 | I-CAT2 | 300 | 89 | 9.5 |

As can be seen from FIG. 1 the inventive catalysts result in much steeper slope of MFR vs. hydrogen amount. This indicates that with the inventive catalysts within a more restricted variation in hydrogen amount a wider range of the polymer MFR can be obtained.

From FIG. 2 and Table 2 it can be seen that activity of the inventive catalyst is clearly on a higher level than with comparative catalysts at all MFR levels.

Inventive Catalyst Component 3 (I-CAT3)

Catalyst component was prepared as C-CAT2, but instead of adding (ID-1) into the washing step, a second internal donor (ID-2), 2,2,4,-trimethyl-1,3-pentanediol dibenzoate, was added to the washing steps as follows:

Wash 1: Washing was made with a mixture of 65 ml of toluene and 0.53 ml donor (molar ratio of (ID-2)/Mg was 0.1)

Wash 2: Washing was made with a mixture of 20 ml TiCl$_4$ and 0.53 ml of donor (molar ratio of (ID-2)/Mg was 0.1)

Wash 3: Washing was made with a mixture of 65 ml of toluene and 0.53 ml donor (molar ratio of (ID-2)/Mg was 0.1)

Washes 4 and 5: Washings was made with 40 ml of heptane

Afterwards stirring was stopped and the reaction mixture was allowed to settle for 10 minutes decreasing the temperature to 70° C. with subsequent siphoning, and followed by N$_2$ sparging for 70 minutes to yield a catalyst powder.

Inventive Catalyst Component 4 (I-CAT4)

Catalyst component was prepared as C-CAT2, but in addition to (ID-1) also the second internal donor (ID-2), 2,2,4,-trimethyl-1,3-pentanediol dibenzoate was added into the emulsion. The molar ratio of (ID-1)/Mg was 0.4, and the molar ratio of (ID-2)/Mg was 0.05 in the emulsion. Washings were done as in C-CAT2.

Inventive Catalyst Component 5 (I-CATS5)

Catalyst component was prepared as C-CAT2, but instead of adding (ID-1) into the washing steps, a second internal donor (ID-2), 2,2,4-trimethyl-1,3-pentanediol dibenzoate, was added to the washing step as follows:

Wash 1: Washing was made with a 65 ml of toluene.

Wash 2: Washing was made with a mixture of 20 ml TiCl$_4$ and 1.59 ml of donor (molar ratio of (ID-2)/Mg was 0.3)

Wash 3: Washing was made with 65 ml of toluene.

Washes 4 and 5: Washings were made with 40 ml of heptane.

Afterwards stirring was stopped and the reaction mixture was allowed to settle for 10 minutes decreasing the temperature to 70° C. with subsequent siphoning, and followed by N$_2$ sparging for 65 minutes to yield a catalyst powder.

Inventive Catalyst Component 6 (I-CAT6)

Catalyst component was prepared as I-CAT5, but to the second wash the second donor (2,2,4-trimethyl-1,3-pentanediol dibenzoate) was added with (ID-2)/Mg molar ratio of 0.15, and the first donor (bis(2-ethylhexyl) citraconate) with (ID-1)Mg ratio of 0.14

Table 3 shows the chemical composition of the comparative catalyst components C-CAT1, C-CAT2, and inventive catalyst components I-CAT3, I-CAT4, I-CATS and I-CAT6.

TABLE 3

| | | | Final catalyst component | | | |
|---|---|---|---|---|---|---|
| Catalyst | 1D-1 Added to | 1D-2 Added | Mg to | Ti [wt %] | (ID-1) [wt %] | (ID-2) [wt %] |
| C-CAT1 | emulsion | — | 13.8 | 2.7 | 20.2 | — |
| C-CAT2 | emulsion + wash | — | 13.4 | 2.4 | 27.0 | • |
| I-CAT3 | emulsion | wash | 12.0 | 2.5 | 23.0 | 20.2* |
| I-CAT4 | Emulsion + wash | emulsion | 12.5 | 2.0 | 20.5 | 22.7* |
| I-CAT5 | Emulsion | wash | 12.9 | 2.3 | 5.5 | 35.0* |
| I-CAT6 | Emulsion + wash | wash | 13.9 | 2.5 | 10.5 | 25.3* |

*Calculated amounts. Calculations made according to the following formula: Amount of (ID-2)(wt-%) in the catalyst component = 100-[MgCl$_2$(wt-%) + TiCl$_4$(wt-%) + (ID-1)(wt-%) + (ID-3)(wt-%)] = 100-[Mg(wt-%) × 3.91 + Ti(wt-%) × 3.96 + (ID-1)(wt-%) + (ID-3)(wt-%)] 3.91 = mol weight of MgCl$_2$/mol weight of Mg = 95.2 (g/mol)/24.3 (g/mol) 3.96 = mol weight of TiCl$_4$/mol weight of Ti = 189.7 (g/mol)/47.9 (g/mol)

The calculation is based on the assumption that all Mg is as MgCl$_2$, all Ti is as TiCl$_4$, and no other components are present except (ID-1). No (ID-3) was used.

Polymerization

Comparative polymerization examples CP1 and CP2 were done with comparative catalyst components C-CAT1 and C-CAT2 as above and inventive polymerization examples IP7 to IP10 with catalyst components I-CAT3 to I-CAT6 as indicated in Table 4. Polymerization was done in the same manner as above. Hydrogen amount was in these examples 200 mmol. Results are disclosed in Table 4.

TABLE 4

| Polymerisation results and polymer properties | | | | | | |
|---|---|---|---|---|---|---|
| Polymerisation example | Catalyst component | Activity/ kgPP/gcat | XS/ [wt %] | MFR$_2$/ g/10 min | I$_{MFR2}$/%I$_{norm}$/ (FTIR) | % * |
| CP1 | C-CAT1 | 34 | 18.5 | 18.5 | 97.5 | 95.6 |
| CP2 | C-CAT2 | 42 | 1.3 | 9.9 | 98.6 | 98.6 |
| IP7 | I-CAT3 | 22 | 2.0 | 3.1 | 98.5 | 100.0 |
| IP8 | I-CAT4 | 19 | 1.9 | 4.8 | 99.2 | 100.3 |
| IP9 | I-CAT5 | 25 | 2.1 | 3.3 | 98.3 | 99.7 |
| IP10 | I-CAT6 | 23 | 2.7 | 3.7 | 98.3 | 99.7 |

* FTIR isotacticity (I$_{MFR2}$) normalised to a MFR$_2$ of 10 g/10 min as follows: MFR has a strong effect on isotacticity. Therefore in order to have comparable results, measured isotacticity values of the polymer with MFR$_2$ as measured have been normalised to MFR$_2$ of 10 g/10min according to the following calculation: I$_{norm}$ = I$_{MFR2}$ − s(MFR$_2$-10), where I$_{norm}$ is the normalised isotacticity value I$_{MFR2}$ is the measured isotacticity of the polymer having MFR$_2$ as measured s is the correlation factor between isotacticity and MFR and has the value 0.219%/(g/10 min) obtained.

It can be seen that addition of bis(2-ethylhexyl)citraconate (ID-1) to the washes decreases the hydrogen sensitivity of the catalyst and consequently increases isotacticity. However, by using a different second donor (ID-2) (added to the emulsion or during the washes) the effect is significantly stronger, i.e. a clear increase in isotacticity can be seen.

The invention claimed is:

1. A solid, particulate catalyst component having a mean particle size range of 5 to 200 μm and comprising
   i) a compound of Group 2 metal, IUPAC, Nomenclature of Inorganic Chemistry, 1989,
   ii) a compound of a transition metal of Group 4 to 6, IUPAC, Nomenclature of Inorganic Chemistry, 1989,
   iii) a first internal electron donor and a second internal electron donor, which are different from each other,
wherein the first internal electron donor is a non-phthalic organic compound selected from esters of non-phthalic carboxylic acids, or di-esters of 1,3-diol compounds, and
   iv) an additional internal electron donor, which is a third internal electron donor,
wherein the second internal electron donor and the third internal electron donor are selected from esters of non-phthalic carboxylic acids, or diesters of 1,3-diol compounds, wherein the solid particulate catalyst component is free of any phthalic compound and external support material.

2. The solid, particulate catalyst component according to claim 1, wherein the Group 2 metal is magnesium.

3. The solid, particulate catalyst component according to claim 1, wherein the transition metal of Group 4 to 6 is a Group 4 metal.

4. The solid, particulate catalyst component according to claim 1, wherein the amount of the first internal electron donor is in the range of 1 to 25 wt-%, and the sum of the amounts of the second and the third internal electron donors is in the range of 1 to 50 wt-% in the catalyst component.

5. The solid, particulate catalyst component according to claim 1, wherein the total amount of the first, the second, and the third internal electron donors in the catalyst component is in the range of 5 to 50 wt-%.

6. A Ziegler-Natta catalyst comprising the solid catalyst component of claim 1, a co-catalyst of an organoaluminium compound, and an external electron donor.

7. A process for producing propylene polymers by polymerising propylene and a comonomer selected from $C_2$-$C_{12}$ monomers in a process comprising at least one polymerisation step in the presence of the catalyst of claim 6.

8. The solid, particulate catalyst component according to claim 1, wherein the first internal electron donor is a non-phthalic organic compound selected from esters of non-phthalic carboxylic acids, or di-esters of 1,3-diol compounds, and the second internal electron donor and the third internal electron donor are selected from diesters of 1,3-diol compounds.

* * * * *